United States Patent

Bonnet et al.

[11] 4,053,440
[45] Oct. 11, 1977

[54] LATEX COMPOSITIONS SENSITIVE TO HEAT

[76] Inventors: Jean Claude Bonnet, 41 avenue de France, Blois (Loir & Cher); Alain Ribba, 16 rue Ronsard, Chateaurenault (Indre & Loire), both of France

[21] Appl. No.: 601,042

[22] Filed: Aug. 1, 1975

[30] Foreign Application Priority Data

Aug. 2, 1974 France .................................. 74.27662

[51] Int. Cl.$^2$ ................................................ C08L 7/02
[52] U.S. Cl. ........................ 260/4 R; 260/29.6 MN; 260/29.6 NR; 260/29.6 ME; 260/29.6 RB; 260/29.7 N; 260/29.7 NR; 260/29.7 E
[58] Field of Search ............... 260/29.6 NR, 29.7 NR, 260/29.7 E, 29.6 ME, 29.6 RB, 29.2 TN, 4 R, 29.6 MN, 29.7 N

[56] References Cited

U.S. PATENT DOCUMENTS

| | | | |
|---|---|---|---|
| 3,190,847 | 6/1965 | Mitchell et al. | 260/29.6 NR |
| 3,264,134 | 8/1966 | Vill et al. | 260/29.2 TN |
| 3,484,394 | 12/1969 | Holdstock | 260/4 R |
| 3,539,482 | 11/1970 | Stewart | 260/29.2 TN |
| 3,539,483 | 11/1970 | Keberle et al. | 260/29.6 NR |
| 3,770,684 | 11/1973 | Singer et al. | 260/29.6 NR |
| 3,862,074 | 1/1975 | Hickey | 260/29.6 NR |
| 3,905,929 | 9/1975 | Noll | 260/29.2 TN |

*Primary Examiner*—M. J. Welsh
*Attorney, Agent, or Firm*—Karl F. Ross

[57] ABSTRACT

A latex composition sensitive to heat, particularly for use as a binder for nonwoven fabrics, comprises 0.05 to 5 parts by weight per 100 parts by weight of a latex (as the dry solids) of a urethane-oxyalkylene copolymer having the formula

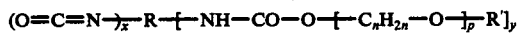

in which R represents an aliphatic group and/or an aromatic group which can contain a biuret group, a urethane group or isocyanate groups, R' is hydrogen or a lower alkyl radical having 1 to 8 carbon atoms (straight or branch chain), an aryl radical or an alkylaryl radical, $x$ is 0 or 1, $y$ is always greater than 2 and $x+y$ is also always greater than 2; $n$ has a value ranging between 2 and 4 inclusive while $p$ has a value at least equal to 5.

5 Claims, No Drawings

LATEX COMPOSITIONS SENSITIVE TO HEAT

The present invention relates to latex compositions sensitive to heat and, more particularly to, latex compositions which can be coagulated when heated through a well-defined activation temperature, the latex compositions being primarily used as binders in nonwoven fabrics.

Various latex compositions have been proposed heretofore which are sensitive to heat and are capable of being used as binders for nonwoven fabrics and for articles which are at least in part formed by heat. More generally, the sensitivity to heat of a latex is used in the manufacture of articles at least in part by heating. In nonwoven fabric manufacture, the latex is precipitated on nonwoven fibers at a well defined temperature which should be kept relatively low to prevent migration of the binder, during drying, toward the surface of the nonwoven fabric and to improve the mechanical strength and chemical properties of the article.

As noted, the thermal precipitation of certain latexes has been proposed heretofore, but this action generally requires relatively high temperatures of the order of 100° C. The addition of thermal sensitizing agents to the latex has also been proposed and these products are generally polyvinylmethyl ethers, polypropyleneglycols of low molecular weight and zinc-amine compounds. All of these materials are difficult to apply to the coagulation of synthetic latexes since they must be utilized in large quantities and require a relatively high coagulation temperature.

Recently, modified polysiloxanes have been suggested as thermal-sensitizing agents for synthetic latexes but these compounds have not been found to be convenient for all types of synthetic polymeric latexes and particularly for acrylic polymer latexes which are widely used in the manufacture of nonwoven fabrics.

The principal object of the present invention is to provide a new latex composition sensitive to heat and containing a thermal sensitization agent which can be employed in relatively low quantities, imparts a sensitization to heat at low temperatures and is capable of being used for all types of synthetic latexes.

This object is attained, in accordance with the present invention, by providing a latex composition which contains a thermosensitization agent in the form of a urethane-oxyalkylene copolymer soluble in cold water and which sensitizes the latex so that it coagulates at a well defined temperature substantially below that characterizing earlier latex systems.

The thermally sensitive latex composition according to the invention comprises by weight 100 parts of the latex and 0.05 to 5 parts by weight (per 100 parts by weight of the latex in terms of the dry solids) of the copolymer of urethane and oxyalkylene, the copolymer having the formula (1):

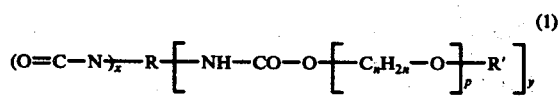

(1)

In formula (1) R is an aliphatic structure and/or an aromatic structure which can contain a biuret group, a urethane group or an isocyanate group; R' is hydrogen, an alkyl radical having 1 to 8 carbon atoms (lower alkyl) of straight or branched chain, an aryl radical or an alkylaryl radical, $x$ is between 0 and 1, $y$ is always greater than 2 $x+y$ is also always greater than 2, $n$ is 2 to 4 (inclusive) and $p$ has a value of at least 5.

Throughout this description, when reference is made to an alkyl radical per se or as part of an oxylalkyl radical or as an alkyl radical attached to an aryl group, the alkyl will contain from 1 to 8 carbon atoms.

The radicals R' according to the invention is preferably methyl, ethyl, propyl, butyl, isobutyl, 2-ethylhexyl, benzyl, phenyl, tolyl, xylyl, octylphenyl, nonylphenyl, or naphthyl; p is always equal to 5 or to a value greater than 5 and preferably ranges between 5 and 100 or more.

The radicals R in formula (1) are well known to those skilled in the art and examples of them are found in the isocyanate groups which are known in the literature and are commercially available. The radicals R' are generally associated with the polyalkylene glycols and their ethers, and likewise are commercially available and described widely in the literature.

The copolymers urethane-oxyalkylene according to the present invention can be prepared by reacting a polyisocyanate of the formula:

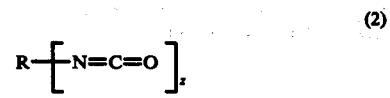

(2)

where $z = x + y$ as defined above and is always greater than 2 with 30 to 100% by weight of a monoalkylic, monoarylic or monoalkylarylic ether of polyalkylene glycol of the formula:

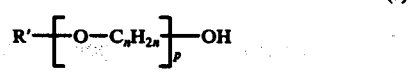

(3)

and 0 to 30% by weight of polyalkyleneglycol of the formula:

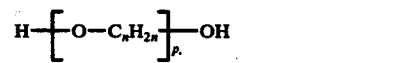

(4)

In the formulas (2), (3), (4) given above the radicals R, R' and the coefficients $n$, $p$ have the meanings previously set forth. The reaction is carried out under conditions such that the isocyanate functional groups react in part or completely with the hydroxyl groups terminating the polyalkylene glycols and their ethers.

The polyisocyanates represented by formula (2) are well known to the skilled worker in the art. The principal polyisocyanates utilized according to the invention are:

a. the polyphenylic isocyanates of the formula:

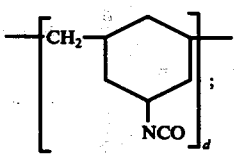

(The reaction product corresponds to the formula (1) wherein R is

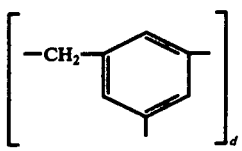

in which $d$ has a value from 2.4 to 2.8).

b. The triphenylmethyl triisocyanate of the formula:

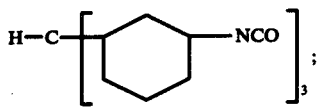

c. The polyisocyanates prepared by condensation diisocyanate and a polyol under conditions such that the compound contains per molecule at least two $N-C-O$ groups in a free or reactive state.

An example of this class of polyisocyanate is the product of the reaction of three moles of tolylene diisocyante with one mole of trimethylolpropane which gives a urethane structure which can be represented ideally by the formula:

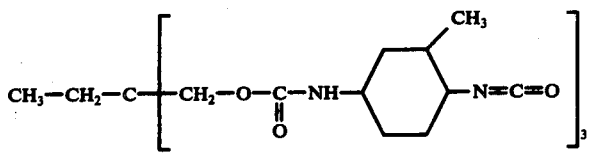

(The reaction product corresponds to the formula (1) in which R is

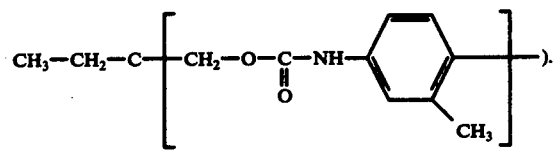

d. The polyisocyanates prepared by condensation of a diisocyanate with water with the formation of cylical isocyantes.

e. The polyisocyanates prepared by condensation of diisocyanate with water with formation of biuret groups.

An example of this class of polyisocyanates is the product of the condensation reaction of water with three moles of 1,6-hexamethylene diisocyanate which produces the biuret structure represented by the formula:

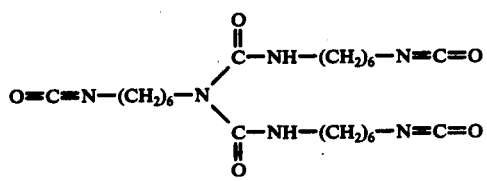

(The reaction product corresponds to the formula (1) wherein R is

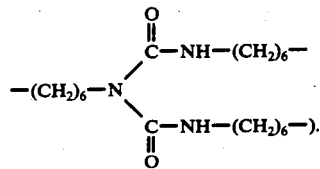

The list of polyisocyanates which can be used according to the invention and given above should not be considered limiting although the list does represent the preferred polyisocyanates. Furthermore, the polyisocyanates can be used individually or in admixture.

The monoethers of the polyalkylene glycols represented by formula (3) and the polyalkylene glycols represented by formula (4) are also well known to those skilled in the art. It is possible to form these compounds by reacting water or a monohydric alcohol of the formula R'OH with an alkylene oxide or a mixture of alkylene oxides. The reaction conditions are controlled so as to ensure an oxyalkylene number (value of p) per mole of water or alcohol in excess of 5 and preferably between 5 and 100 or more. The molecular weight of the polyalkylene glycols and the monoethers is preferably between 800 and 20,000. The alkylene oxides which are most desirable according to the invention are those containing 2 to 4 atoms of carbon (inclusive) per alkylene group such as ethylene oxide, propylene oxide and butylene oxide.

The monoethers of the polyalkylene glycols and the polyalkylene glycols are able to contain oxyalkylene groups which are all identical or a mixture of oxyalkylene groups. In the preferred compounds of the present invention, the oxyalkylene groups are a mixture of ethylene oxide groups and propylene oxide groups. When such a mixture is used, it is generally preferable for the oxyethylene groups to constitute 25 to 75% of the total weight of the thermosensitization compound. The preferred polyalkylene glycol compounds are the monoethers thereof. Of course it is possible to use a mixture of monoethers of polyalkylene glycols and of polyalkylene glycols. In this case the polyalkylene glycols should not make up more than 30% by weight of the mixture of polyalkylene glycols monoethers and the nonetherified polyalkylene glycols.

The reaction used to prepare the copolymer of urethane and alkylenes according to formula (1) is relatively direct and simple. It can be carried out by directly mixing the polyisocyanates and a mixture of polyalkyleneglycol ethers as described above and heating the reaction mixture to a temperature between 80° and 100° C to effect the reaction. A suitable solvent for the reaction mixture is toluene although any other solvent for the two components may be used. The toluene can be provided with or without a catalyst for the isocyanate-hydroxyl reaction. Suitable catalysts are tertiary amines or tin salts. The urethane-alkylene copolymers of formula (1) are obtained in the form of viscous oils which are soluble in cold water and have a cloud point of about 30° through 50° C. Their aqueous solutions are stable and compatible with natural or synthetic polymer latexes.

The latexes which can be used in the compositions of the present invention include rubber (natural) latexes of the caoutchouc type as well as synthetic polymer latexes of conventional types.

The latter latexes include, for example, the homopolymers of conjugated diolefins (such as butadiene, methylbutyldiene, isoprene and their homologs), the copolymers of these diolefins with vinylic monomers (containing the etherylradical-$CH_2$-$CH_2$) and acrylic monomers copolymerizable therewith (such as styrene, methylmethacrylate, vinyl acetate, acrylonitrile, acrylic esters, acrylic acid, methacrylic acid, vinyl chloride, vinylidene chloride), the copolymers of conjugated diolefins with iso-olefins such as isobutylene, the homopolymers and copolymers of ethylene with vinylic monomers and acrylic monomers such as those stated above or with olefins copolymerizable therewith such as propylene, the homopolymers and copolymers of vinylic compounds (such as vinyl acetate, vinyl chloride, the homopolymers and copolymers of acrylic esters such as methylacrylate, ethylacrylate, butylacrylate, methylmethacrylate, butylmethacrylate, acrylic acid, methacrylic acid, acrylamide, N-methylol acrylamide, glycidyl methacrylate, vinylic-acrylic copolymers such as the copolymer of vinyl acetate with acrylic esters, vinyl chloride copolymers or vinylidene copolymers with acrylic esters and copolymers of styrene with acrylic esters).

While the aforementioned types of latexes are preferred, we have found no latex of a synthetic polymer material to which the present invention is not applicable.

The latexes can contain the usual additives or adjuvants necessary to promote vulcanization or reticulation of the polymer and additives to improve the stability of the latexes and the mechanical strength and chemical inertness of the resulting polymers. Thus in the textile industry one may employ ammonium salts (such as ammonium chloride, diammonium phosphate) to promote reticulation of acrylic polymers having reactive of the N-methylol groups type or the like. Such additives can be used with systems in accordance with the present invention without difficulty.

The natural or synthetic polymer latexes in accordance with the present invention should contain 25 to 75% by weight of dry solids and preferably 40 and 50% by weight.

The thermosensitive compositions according to the present invention are obtained by simply adding the urethane-alkylene oxide copolymer of formula (1) to the latex, utilizing a quantity of the copolymer necessary to obtain the desired coagulation temperature. This temperature can be controlled for any particular latex by the proportion of the urethane-alkylene copolymer which is added, although the coagulation temperature will generally lie in a range between 30° C and 80° C. In general it is preferred to control the coagulation temperature so that it lies between 35° C and 55° C for best results with respect to storage of the bath and its use.

The alkylene oxide-urethane copolymers of formula (1) which are in liquid or waxy form can be added to the latex as is or dissolved in water. In the latter case the aqueous soltuion is added to the latex. In general it is preferred to add an aqueous solution of the urethane-alkylene oxide copolymer to the latex.

The quantities of urethane-alkylene oxide copolymers which can be used to obtain the thermosensitivity described are generally between 0.05 and 5 parts by weight per 100 parts by weight of the solid material of the latex. The latex compositions can be employed generally in the manner of prior art thermosensitive latexes, especially for forming thick or thin coatings on patterns or objects immersed in the latex composition and for the production of nonwoven fabrics of considerable strength which are free from the migration of the binder during drying.

EXAMPLE 1

In a 2-liter flask provided with an agitator, a thermometer and a reflux condenser, 500 grams of toluene and 100 grams of the monobutylic ether of a copolymer of ethylene glycol and propylene glycol (in the proportion 50/50 by weight) of a molecular weight of about 10,000, are processed. Traces of water are first eliminated by azeotropic distillation of the water-toluene and then 2.5 grams of the polyisocyanate of phenylene polyisocyanate (commercially marketed under the designation PAPI) prior to the reaction. The mixture is heated at 100° to 110° C for a period of three hours whereupon the toluene is eliminated by distillation in vacuo at 170° C and 40 mm of mercury.

The product (A) thus obtained is a clear yellow oil of high viscosity, soluble in cold water, having a cloud point of 44° C.

The composition which follows is used:

| Parts by Weight | Constituent |
|---|---|
| 98 | Copolymer latex ethylacrylate acrylonitrile - vinyltriethoxysilane containing 45% of dry matter |
| 1 | A solution of 10% of (A) in water |
| 1 | A solution of ammonium chloride (10%) in water |

The composition contains 0.23% by weight of the thermosensitive agent with respect to the dry material of the latex. This composition has coagulation temperature of 42° C.

EXAMPLE 2

The method of Example 1 is followed utilizing an excess of phenylene polyisocyante with respect to the butylic monoether of polyethylene/polypropylene glycol (50/50 by weight).

The product (B) thus obtained, which contains isocyanate groups in a free or reactive state, can then be reacted with water and is a brownish clear oil of high viscosity, soluble in cold water and having a cloud point of 38° C.

A number of compositions are prepared as follows:

| Parts by Weight | Constituent |
|---|---|
| 98 | Latex containing 46% dry matter |
| 1 | Solution of 10% of (B) in water |
| 1 | A solution of ammonium chloride (10%) in water |

This corresponds to a percentage of the thermosensitizing agent of the order of 0.2% with respect to the dry material of the latex.

The composition utilizes the following types of latexes with the results given:

| Latex | Coagulation Temperature |
|---|---|
| Ethyl polyacrylate | 48° C |
| Copolymer of ethylacrylate and acrylonitrile | 39° C |
| Copolymer of ethylacrylate and acrylic acid- methylolacrylamide | 39° C |
| Copolymer of ethylacrylate with butylacrylate-methylolacrylamide | 41° C |
| Copolymer of butylacrylate with the methacrylate of methacrylic acid | 56° C |
| Copolymer of butydiene and acrylonitrile | 43° C |
| Copolymer of the vinyl-acrylic type | 50° C |

The foregoing compositions have a stability under storage of three months without change in the coagulation properties.

EXAMPLE 3

Into a 2-liter flask provided with an agitator, a thermometer and a reflux condenser, there are introduced 500 grams of toluene and 100 grams of the butylicmonoether of polyethylene glycol-polypropylene glycol of molecular weight of the order of 8000, the ethyleneglycol and the propyleneglycol being present in a proportion of 50/50 by weight.

After elimination of water by axeotropic distillation, 3.5 grams of a solution of 75% concentration of a polyisocyanate obtained by condensation of hexymethylene diisocyanate with water, is introduced. This polyisocyanate is commercially marketed under the name DESMODUR N.

The mixture is refluxed for 2 hours and the solvent is eliminated by distillation at 170° C under a vacuum of 40 mm of mercury.

An oily product (C) of yellowish clear color is obtained. The product C is soluble in cold water and has a cloud point of 44° C.

The thermosensitive compound C is introduced into a composition of the following type:

| Parts by Weight | Constituent |
|---|---|
| 96 | Latex copolymer of ethylacrylate and acrylonitrile containing 45% by weight dry matter |
| 1 | Solution of 10% of C in water |
| 1 | Solution of ammonium chloride (10%) in water |
| 2 | Polyoxide of ethylene terminated by nonylphenol (nonylphenolethel of polyoxyethylene) |

This constitutes a concentration of 0.2% of the thermosensitizing agent with resepct to the dry material latex. This composition has a coagulation temperature of 43° C. The effect of concentration of the thermosensitive agent on the coagulation temperature has also been studied in a composition of the last mentioned type. The coagulation temperature appears to drop with increasing concentration of the thermosensitizing substance:

| Concentration of (C)% | 0.05 | 0.1 | 0.2 | 0.5 | 1 |
|---|---|---|---|---|---|
| Coagulation temperature | 46° C | 43° C | 41° C | 37° C | 34° C |

It has been found to be possible, therefore, to precisely control the coagulation temperature of the composition simply by regulating the concentration of the thermosensitizing agent.

EXAMPLE 4

Into a 2-liter flask provided with an agitator, thermometer and a reflux condenser, 500 grams of toluene and 100 grams of the butylicmonoether of polyethylene glycol/polypropylene glycol (50/50 by weight) with a molecular weight of 10,000 are introduced.

After the water has been eliminated by azeotropic distillation, 5.7 grams of a 75% solution of a polyisocyante obtained by the condensation of toluene diisoncyanate with trimethylolpropane, in ethylacetate, is introduced. The polyisocyanate is commercially available under the name DESMODUR L. The mixture is refluxed for three hours and the toluene is then removed by vacuum distillation at 40 mm mercury and 170° C. The produce (D) thus obtained is very viscous yellow oil soluble in cold water and having a cloud point of 42° C. The compositions are prepared in the following proportions:

| Parts by Weight | Constituents |
|---|---|
| 96 | Latex - 46% dry solids |
| 3 | Solution of 10% of D in water |
| 1 | Ammonium chloride solution (10%) in water |

The composition contains 0.6% thermosensitive agent with respect to the dry materials of latex.
The following results were obtained:

| Nature of the Latex | Coagulation Temperature |
|---|---|
| Polyacrylate (ethyl) | 55° C |
| Ethylacrylate - acrylonitrile copolymer | 45° C |
| Ethylacrylate - butylacrylate copolymer | 53° C |

These compositions have a stability under storage of the order of three months without change of thermosensitive properties.

EXAMPLE 5

Into a 2 liter flask provided with an agitator, a thermometer and reflux condenser, there are introduced 500 mm of toluene, 70 grams of butylicmonoether of polyethylene/polypropylene glycol (proportion 50/50 by weight) with a molecular weight of 10,000, and grams of the nonylphenolether of polyethylene glycol having a molecular weight of 1524. After elimination of traces of water by azeotropic distillation, 7.2 grams of a solution commercially available under the name DESMODUR N is introduced. This solution has a concentration of 75% by weight of a mixture of ethyglycolacetate and xylenepolyisocyanate.

The reaction mixture is refluxed for three hours, the solvents being eliminated by distillation at 170° C under a vacuum of 40 mm of mercury.

The product (E) thus obtained is white, highly viscous, soluble in water (cold) and has a cloud point of 41° C.

The following compositions are prepared:

| Parts by Weight | Constituent |
|---|---|
| 98 | 46% dry solids latex |
| 1 | 10% solution of (E) in water |
| 1 | Ammonium chloride solution (10%) in water |

This corresponds to a concentration of 0.23% by weight of the thermosensitive agent with respect to the dry material of the latex.

The following coagulation temperatures are obtained:

| Nature of Latex | Coagulation Temperature |
| --- | --- |
| Ethylacrylate-acrylonitrile copolymer | 42° C |
| butadiene-acrylic copolymer | 46° C |
| ethylacrylate-acrylic acid-methylolacrylamide copolymer | 63° C |
| ethylpolyacrylate | 47° C |

Each of the aforementioned compositions has a stability on storage of the order of three months.

EXAMPLE 6

The preceding Example is repeated with a mixture of 70 grams of the monobutylether of polyethylene-polypropylene glycol (proportion 50/50 by weight) with a molecular weight of 10,000 and 30 grams of a copolymer sequence: polyethylene-polypropylene glycol commercially marketed under the name PLURONIC of a molecular weight of 1830, and 8.5 grams of the polyisocyanate of Example 5.

The product (F) is obtained which is highly viscous, white, soluble in cold water and having a cloud point of 45° C.

The following compositions are prepared:

| Parts by Weight | Constituents |
| --- | --- |
| 97 | 46% dry solids latex |
| 2 | 10% solution of (F) in water |
| 1 | Ammonium chloride solution (10%) in water |

This corresponds to a proportion of 0.44% by weight of the thermosensitive agent with respect to the dry material of the latex.

The following coagulation temperatures were obtained:

| Nature of the Latex | Coagulation Temperature |
| --- | --- |
| Polyacrylate (ethyl) | 44° C |
| Ethylacrylate-acrylonitrile copolymer | 50° C |
| butadiene-acrylonitrile copolymer | 45° C |
| ethylacrylate-acrylic acid-methylolacrylamide copolymer | 48° C |

The preceding compositions have a storage stability of three months.

EXAMPLE 7

A series of latex compositions are prepared with varying amounts of dry material of the latex between 15 and 46%. The proportion of the thermosensitive agent with respect to the solid material of the latex is maintained at 0.2% in all cases. The composition is the same as in Example 6 with the ethylacrylate of acrylonitrile.

The results show that acceptable coagulation temperatures are achieved even with very low solids content of the latex.

| Concentrations of solids in the latex | Coagulation Temperature |
| --- | --- |
| 46% | 40° C |
| 30% | 43° C |
| 23% | 43° C |
| 18% | 44° C |
| 15% | 46° C |

We claim:

1. A latex composition sensitive to heat consisting essentially of a natural or synthetic latex and 0.5 to 5 parts by weight per 100 parts by weight of dry solids of the latex of a urethane-oxylalkylene copolymer having the formula:

$$(O{=}C{=}N{\rightarrow}_x R{\rightarrow}NH{-}CO{-}O{\rightarrow}C_nH_{2n}{-}O{\rightarrow}_p R]_y$$

in which R is an aliphatic or aromatic structure which can contain biuret groups, urethane groups or isocyanate groups, R' is selected from the group which consists of hydrogen, lower alkyl having 1 to 8 carbon atoms and of straight or branched chain, aryl and alkylaryl, $x$ is 0 or 1, $y$ is always greater than 2, $n$ has a value of 2 to 4 inclusively, and $p$ has a value at least equal to 5.

2. The composition defined in claim 1 wherein R is a radical having the formula:

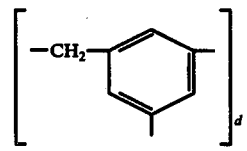

in which $d$ is between 2.4 and 2.8 and R' is butyl.

3. The composition defined in claim 1 wherein R is a radical having the formula:

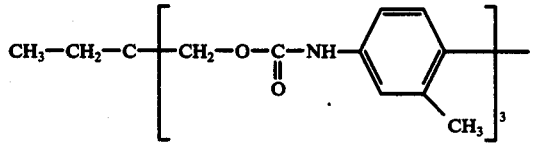

and in which R' is butyl.

4. The composition defined in claim 1 wherein R is a radical having the formula:

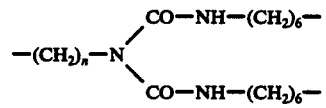

and in which R' is the butyl radical.

5. The composition defined in claim 1 wherein said latex is selected from the group consisting of natural rubber, the homopolymers and copolymers of vinylic monomers, the homopolymers and copolymers of acrylic monomers, and the homopolymers and copolymers of olefins and diolefins.

* * * * *